Jan. 29, 1957     H. H. WATERS     2,779,386
METHOD OF VULCANIZING TUBELESS TIRES
Filed Dec. 4, 1953
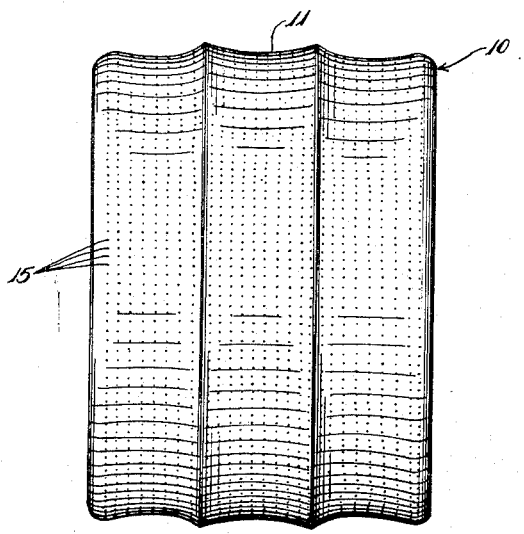
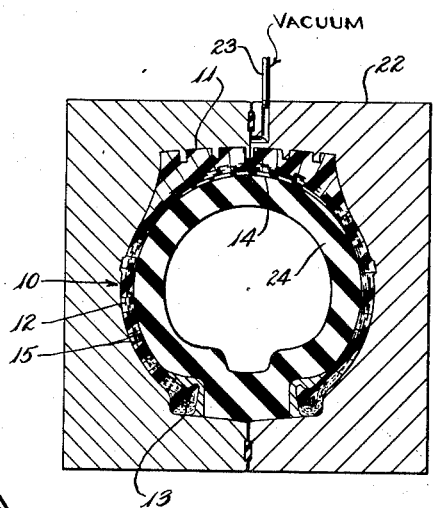
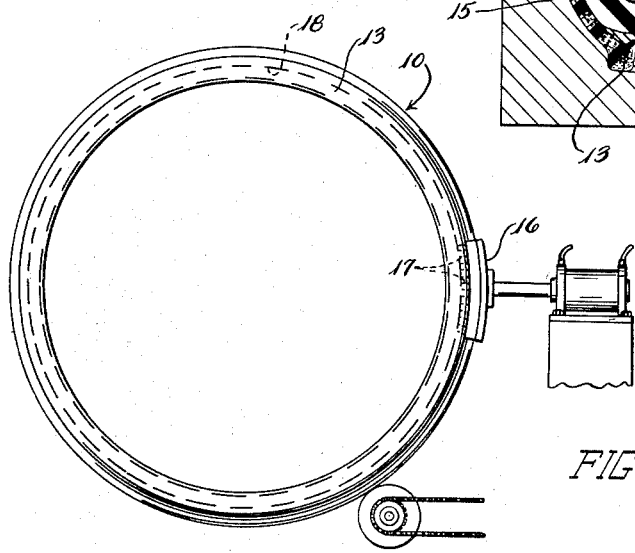
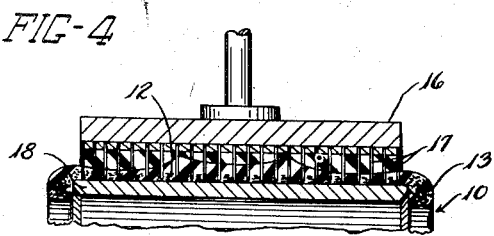
INVENTOR.
HERBERT H. WATERS
BY
W. A. Fraser
ATTY.

United States Patent Office 2,779,386
Patented Jan. 29, 1957

2,779,386

METHOD OF VULCANIZING TUBELESS TIRES

Herbert H. Waters, Akron, Ohio, assignor to The Firestone Tire & Rubber Company, Akron, Ohio, a corporation of Ohio Application December 4, 1953, Serial No. 396,135

2 Claims. (Cl. 154—14)

This invention relates to tubeless tires and more particularly to a method of venting air from the interior of the tire during manufacture thereof.

Tubeless tires conventionally have a lining of air-impervious material such as butyl rubber to retain air within the tire and to prevent it from seeping into the carcass. One of the problems encountered in manufacturing such tires, however, results from the entrapment of air within the tire during the building operation for the butyl liner makes it much more difficult for air to escape during the cure and as a result the air tends to collect in the form of blisters particularly between the lining and the plies of the tire.

It is to this problem that the present invention offers a solution. The invention contemplates piercing the tread and sidewalls of the tire, but leaving the lining intact and unpierced, and then vulcanizing the tire under a substantial vacuum around the outside of the tire. As the tire cures, the entrapped air is withdrawn by the vacuum through the minute passages in the tire resulting from the piercing operation. The vent openings that remain in the tire after cure do not detract in any way with the quality and performance of the tire.

Accordingly, an object of the invention is to provide a method of removing entrapped air from the interior of a tubeless tire body whereby to prevent the formation of blisters between the laminations of material making up the tire.

A more specific object is to provide a method of removing entrapped air from a tubeless tire which comprises piercing the plies and tread of the tire while leaving the inner lining intact and thereafter vulcanizing the tire under a vacuum.

Further objects and advantages will be more fully apparent from the following description of the invention, reference being had to the accompanying drawing in which:

Figure 1 is a view showing an unvulcanized tubeless tire with a plurality of pierced openings ready for the vulcanizing operation.

Figure 2 is a radial section of the tire of Figure 1 showing the tire expanded in the mold just before the vulcanizing operation.

Figure 3 is a somewhat diagrammatic view illustrating an apparatus and a method of piercing the body of a tire while it is still on the building drum.

Figure 4 shows, on an enlarged scale, the piercing needles in their position of utmost penetration.

The invention is illustrated with reference to a tubeless tire indicated generally at 10 which has a conventional construction comprising a tread portion 11 and body plies 12 which are wrapped about and anchored to the beads 13 of the tire. Such a tubeless tire has an inner lining 14 of air-impervious material, such as butyl rubber, adhered to the interior of the tire. The lining 14 may be assembled with the tire upon the tire building drum at the time the tire is built or it may be secured to the interior of the tire immediately after the tire is removed from the building drum.

Assuming first, that the inner lining is assembled with the body of the tire on the building drum, the present invention contemplates piercing the body of the tire with a plurality of needles of such a length as to penetrate deeply within the body of the tire without reaching and piercing the inner liner, to produce the openings 15. Such a piercing operation may be performed, as indicated diagrammatically in Figure 3, by bringing a reciprocating head 16 carrying a plurality of needles 17 into contact with the tire 10 while it is still on the building drum 18. Figure 4 shows a fragmentary view of such a piercing head with the needles in their position of utmost penetration. The piercing operation may be performed by rotating the tire and building drum so as to bring all portions of the tire successively within the working stroke of the piercing head. Apparatus for driving the head and for driving the drum to perform this operation is conventional and well known to those skilled in the art.

If the inner liner 14 is to be added to the unvulcanized tire, the entire body of the tire can be pierced while it is still on the building drum without requiring any special care to be taken to restrict the stroke of the piercing needle. In that case, the needles can be resiliently mounted and can be driven through the tire until they contact the outer surface of the building drum. After the piercing operation, the lining 14, which of course is unpierced, can be applied to the tire by any one of several methods known to those skilled in the art.

For example, the unvulcanized tire, which after it is removed from the building drum is substantially cylindrical, can be supported externally by a suitable close fitting metal support and the butyl lining which may be in the form of an endless band can be inserted within the tire and expanded forcibly in place against the interior of the tire either by hand stitching or by use of an inflatable expanding bladder. Such a method is shown and described in the copending application of Lancaster and Hollis Serial No. 539,496, filed October 10, 1955.

After the tire is pierced, it is ready for the vulcanizing operation which is performed with more-or-less conventional equipment, the only material difference being the provision of a vacuum between the mold and the exterior of the tire. The vacuum is produced by exhausting the air from the mold either through an exhaust conduit connected in such a manner to the mold as to remove the air just before the mold closes, see Figure 2 in which the air is exhausted from the mold 22 and hence from around the tire 10 by means of an exhaust conduit 23. Alternatively the air can be removed from the interior of the press which houses the mold.

The mold 22 in which the tire is vulcanized and the air bag 24 which forces the tire outwardly against the mold surfaces are both of conventional construction and function. The mold and the bag are heated by the circulation of fluids at the temperatures necessary to produce the desired vulcanizing cycle.

When the tire is first introduced into the mold at the beginning of the curing operation, the vacuum about the exterior of the tire will withdraw the air from the interior of the tire carcass through the pierced openings 15. As the tire flows to conform to the shape of the mold during the vulcanizing operation, some of the openings 15 may become closed, but experience has shown that a sufficient number remain open to permit an effective removal of the air. As a result the tires can be vulcanized with a minimum danger of blisters forming within the tire. The openings 15 which remain in the fully vulcanized tire continue to vent the tire during its operation and in no way detract from the performance and life of the tire.

The extent to which the tire is pierced may vary within rather large limits. In some cases the rubber sidewalls only may be pierced. In other cases the needles may penetrate the ply portions of the tire as well. In the latter case it is desirable that the piercing needles have blunt ends so as to deflect the cords of the plies during the piercing stroke and in this manner avoid cutting the cords.

While a preferred form of the invention has been described, various modifications will occur to those skilled in the art without departing from the spirit and scope of the invention, the features of which are summarized in the appended claims.

I claim:

1. The method of building a tubeless tire which comprises assembling ply portions, beads, sidewall portions, a tread portion and an air impervious inner liner upon a tire building drum, piercing only said portions at a plurality of points to provide communication between the interior of said portions and the atmosphere while leaving said inner liner intact, and vulcanizing said tire under internal pressure in a heated, confining mold in the presence of an external vacuum whereby the entrapped air and gases are effectively withdrawn from within the body of said tire.

2. The method of vulcanizing a tubeless tire of the type having a body portion which includes a tread, body plies, and an air impervious lining, which comprises forming a plurality of small vent holes in said body plies by forcing needle-like piercing means from the outer surface of said tire a distance into at least some of said plies but short of piercing said inner lining, laying said pierced tire in a vulcanizing mold, withdrawing air from between said tire and said mold and thereby evacuating air from between said body plies through said vent holes, and vulcanizing said tire while said air is being withdrawn.

References Cited in the file of this patent
UNITED STATES PATENTS

| | | |
|---|---|---|
| 1,433,971 | Roberts | Oct. 31, 1922 |
| 2,007,825 | Day | July 9, 1935 |
| 2,031,560 | Day | Feb. 18, 1936 |
| 2,304,461 | Knowles | Dec. 8, 1942 |

FOREIGN PATENTS

| | | |
|---|---|---|
| 476,004 | Canada | Aug. 14, 1951 |